US011675997B2

United States Patent
(12) United States Patent
Kim et al.

(10) Patent No.: US 11,675,997 B2
(45) Date of Patent: Jun. 13, 2023

(54) DEVICE AND METHOD FOR PROCESSING CONVOLUTION OPERATION USING KERNEL

(71) Applicant: SAMSUNG ELECTRONICS CO., LTD., Suwon-si (KR)

(72) Inventors: Kyoung-hoon Kim, Suwon-si (KR); Young-hwan Park, Yongin-si (KR); Dong-kwan Suh, Yongin-si (KR); Keshava Prasad, Suwon-si (KR); Dae-hyun Kim, Seoul (KR); Suk-jin Kim, Seoul (KR); Han-su Cho, Suwon-si (KR); Hyun-jung Kim, Suwon-si (KR)

(73) Assignee: SAMSUNG ELEOTRONICC CO., LTD., Suwon-si (KR)

(*) Notice: Subject to any disclaimer, the term of this patent is extended or adjusted under 35 U.S.C. 154(b) by 1073 days.

(21) Appl. No.: 16/163,772

(22) Filed: Oct. 18, 2018

(65) Prior Publication Data

US 2019/0147319 A1 May 16, 2019

(30) Foreign Application Priority Data

Nov. 14, 2017 (KR) ........................ 10-2017-0151722

(51) Int. Cl.
*G06N 3/04* (2006.01)
*G06F 17/15* (2006.01)
(Continued)

(52) U.S. Cl.
CPC ............... *G06N 3/04* (2013.01); *G06F 12/06* (2013.01); *G06F 17/15* (2013.01); *G06F 21/52* (2013.01);
(Continued)

(58) Field of Classification Search
CPC ........ G06N 3/04; G06N 3/0454; G06N 3/063; G06N 5/046; G06F 12/06; G06F 17/15;
(Continued)

(56) References Cited

U.S. PATENT DOCUMENTS

| | | |
|---|---|---|
| 9,665,799 B1 | 5/2017 | Munteanu et al. |
| 9,710,748 B2 | 7/2017 | Ross et al. |

(Continued)

FOREIGN PATENT DOCUMENTS

| | | |
|---|---|---|
| CN | 105243399 A | 1/2016 |
| CN | 107239824 A | 10/2017 |

(Continued)

OTHER PUBLICATIONS

Shi, Wenzhe et al., "Real-Time Single Image and Video Super-Resolution Using an Efficient Sub-Pixel Convolutional Neural Network", arxiv.org, arXiv:1609.05158v2 [cs.CV], Sep. 16, 2016, XP080727223. (10 pages total).

(Continued)

*Primary Examiner* — Ajay Ojha
(74) *Attorney, Agent, or Firm* — Sughrue Mion, PLLC

(57) ABSTRACT

Provided are a method and apparatus for processing a convolution operation in a neural network. The apparatus may include a memory, and a processor configured to read, from the memory, one of divided blocks of input data stored in a memory; generate an output block by performing the convolution operation on the one of the divided blocks with a kernel; generate a feature map by using the output block, and write the feature map to the memory.

18 Claims, 15 Drawing Sheets

(51) Int. Cl.

| | |
|---|---|
| ***G06F 21/52*** | (2013.01) |
| ***G06F 12/06*** | (2006.01) |
| ***G06N 5/04*** | (2006.01) |
| ***G06N 3/063*** | (2006.01) |
| ***G06N 5/046*** | (2023.01) |
| ***G06N 3/045*** | (2023.01) |

(52) U.S. Cl.
CPC ............ *G06N 3/045* (2023.01); *G06N 3/063* (2013.01); *G06N 5/046* (2013.01)

(58) Field of Classification Search
CPC .... G06F 21/52; G06F 12/023; G06F 12/0215; Y02D 10/00
See application file for complete search history.

(56) References Cited

U.S. PATENT DOCUMENTS

| | | | | |
|---|---|---|---|---|
| 11,132,619 | B1 * | 9/2021 | Casas | G06N 3/082 |
| 2014/0180989 | A1 | 6/2014 | Krizhevsky et al. | |
| 2016/0071005 | A1 | 3/2016 | Wang et al. | |
| 2016/0179434 | A1 | 6/2016 | Herrero Abellanas et al. | |
| 2016/0350645 | A1 | 12/2016 | Brothers et al. | |
| 2017/0103299 | A1 | 4/2017 | Aydonat et al. | |
| 2017/0148430 | A1 | 5/2017 | Lee | |
| 2018/0157969 | A1 | 6/2018 | Xie et al. | |
| 2018/0189981 | A1 * | 7/2018 | Singh | G06F 13/10 |

FOREIGN PATENT DOCUMENTS

| | | | |
|---|---|---|---|
| WO | 2017/129325 | A1 | 8/2017 |
| WO | 2017/139927 | A1 | 8/2017 |

OTHER PUBLICATIONS

Communication dated Jun. 23, 2020 by the European Patent Office in counterpart European patent Application No. 18878124.9.

International Search Report and Written Opinion dated Jan. 23, 2019 issued by the International Searching Authority in counterpart International Application No. PCT/KR2018/012123 (PCT/ISA/220, PCT/ISA/210, PCT/ISA/237).

Communication dated Sep. 30, 20222 issued by the Korean Patent Office in Korean Application No. 10-2017-0151722.

Zidong Du, et al. "ShiDianNao: Shifting Vision Processing Closer to the Sensor." Proceedings of the 42nd Annual International Symposium on Computer Architecture (ISCA '15), Portland, OR, USA, Jun. 2015, pp. 92-104. 13 pages. doi: 10.1145/2749469.2750389.

Jorge Albericio, et al. "Cnvlutin: Ineffectual-Neuron-Free Deep Neural Network Computing." Proceedings of the 43rd International Symposium on Computer Architecture (ISCA '16), Jun. 2016, pp. 1-13. 13 pages. doi: 10.1109/ISCA.2016.11.

Norman P. Jouppi, et al. "In-Datacenter Performance Analysis of a Tensor Processing Unit™." Proceedings of the 44th Annual International Symposium on Computer Architecture (ISCA '17), Toronto, ON, Canada, Jun. 2017, pp. 1-12. 17 pages. doi: 10.1145/3079856.3080246.

Yu-Hsin Chen, et al. "Eyeriss: An Energy-Efficient Reconfigurable Accelerator for Deep Convolutional Neural Networks." 2016 IEEE International Solid-State Circuits Conference (ISSCC), San Francisco, CA, USA, Feb. 2016, pp. 262-263. 4 pages. doi: 10.1109/ISSCC.2016.7418007.

First Chinese Office Action issued from the Chinese National Intellectual Property Administration (CNIPA) dated Mar. 29, 2023 to Chinese Patent Application No. 201880070720.1.

* cited by examiner

DEVICE AND METHOD FOR PROCESSING CONVOLUTION OPERATION USING KERNEL

CROSS-REFERENCE TO RELATED APPLICATION

This application is based on and claims priority under 35 U.S.C. § 119 to Korean Patent Application No. 10-2017-0151722, filed on Nov. 14, 2017, in the Korean Intellectual Property Office, the disclosure of which is incorporated by reference herein in its entirety.

BACKGROUND

1. Field

The disclosure relates to a method and device for processing a convolution operation using a kernel. In particular, the disclosure relates to techniques for performing a convolution operation by applying a kernel to divided blocks of input data in a neural network.

2. Description of Related Art

An artificial intelligence (AI) system is a computer system that mimics human intelligence. Also, unlike an existing rule-based smart system, the AI system is a system that trains by itself, decides, and becomes increasingly smarter. Since the recognition rate of the AI system may improve and thus the AI system may more accurately understand a user preference, an existing rule-based smart system has been gradually replaced by AI systems based on deep learning.

AI technology refers to machine learning (deep learning) and element technologies that utilize the machine learning.

Machine learning is an algorithm technology that classifies/learns the features of input data by itself. Element technology encompasses technical fields such as linguistic understanding, visual comprehension, reasoning/prediction, knowledge representation, and motion control.

AI technology is applied to various fields such as linguistic understanding, which is a technology to recognize and apply/process human language/characters and includes natural language processing, machine translation, dialogue systems, query response, speech recognition/synthesis, and the like; visual comprehension, which is a technology to recognize and process objects like human vision and includes object recognition, object tracking, image search, human recognition, scene understanding, spatial understanding, image enhancement, and the like; reasoning prediction, which is a technology to obtain and logically infer and predict information and includes knowledge/probability based reasoning, optimization prediction, preference based planning, recommendation, etc.; knowledge representation, which is a technology to automate human experience information into knowledge data and includes knowledge building (data generation/classification), knowledge management (data utilization), etc.; motion control, which is a technology to control autonomous traveling of a vehicle and motion of a robot, and includes motion control (navigation, collision avoidance, and traveling), operation control (behavior control), etc.; and the like.

SUMMARY

Provided are a method and a device for processing a convolution operation.

Additional aspects will be set forth in part in the description which follows and, in part, will be apparent from the description, or may be learned by practice of the presented embodiments.

In accordance with an aspect of the disclosure, an apparatus for processing a convolution operation in a neural network may include a memory; and a processor configured to read, from the memory, one of divided blocks of input data stored in the memory, generate an output block by performing the convolution operation on the one of the divided blocks by using a kernel, generate a feature map by using the output block, and write the feature map to the memory.

A size of the output block may be larger than a size of the one of the divided blocks.

A size of the output block may vary according to a size of the kernel.

Addresses respectively corresponding to the divided blocks may be assigned with respect to the divided blocks, and the divided blocks may be respectively stored in a plurality of banks of the memory and are accessible by the addresses.

The processor may be further configured to perform conflict-free access to one of the plurality of banks with reference to an address of the one of the divided blocks and read data of the one of the divided blocks from the one of the plurality of banks, based on the conflict-free access.

The processor may be further configured to at least partially apply the kernel to the one of the divided blocks to generate respective output values corresponding to an inner position and an outer position of the one of the divided blocks and generate the output block by using the respective output values.

The processor may be further configured to execute a code temporarily storing kernel information to prevent a stack overflow when performing the convolution operation.

The processor may be further configured to accumulate the output block and other outputs previously stored in the buffer by writing the output block to the buffer and generate the feature map based on results accumulated in the buffer.

The processor may be further configured to convert data of a vertical form of the output block into data of a horizontal form and write the converted data of the horizontal form to the buffer.

The processor may be further configured to perform accumulation using address information of data stored in the buffer and tag information indicating block type information.

In accordance with another aspect of the disclosure, a method of processing a convolution operation in a neural network includes reading, from a memory, one of divided blocks of input data stored in the memory; generating an output block by performing the convolution operation on the one of the divided blocks by using a kernel; generating, via a processor, a feature map by using the output block; and writing the feature map to the memory.

A size of the output block may be larger than a size of the one of the divided blocks.

A size of the output block may vary according to a size of the kernel.

Addresses respectively corresponding to the divided blocks may be assigned with respect to the divided blocks, and the divided blocks may be respectively stored in a plurality of banks of the memory and are accessible by the addresses.

The reading may include performing conflict-free access to one of the plurality of banks with reference to an address of the one of the divided blocks; and reading data of the one of the divided blocks from the one of the plurality of banks, based on the conflict-free access.

The generating of the output block may include at least partially applying the kernel to the one of the divided blocks to generate respective output values corresponding to an inner position and an outer position of the one of the divided blocks; and generating the output block by using the respective output values.

The method may further include executing a code temporarily storing kernel information to prevent a stack overflow when performing the convolution operation.

The generating of the feature map may include accumulating the output block and other outputs previously stored in a buffer by writing the output block to the buffer; generating the feature map based on results accumulated in the buffer.

The accumulating may include converting data of a vertical form of the output block into data of a horizontal form and writing the converted data of the horizontal form to the buffer.

In accordance with another aspect of the disclosure, a non-transitory computer-readable recording medium having recorded thereon a program for performing, via a processor, operations comprising: reading, from a memory, one of divided blocks of input data stored in the memory; generating an output block by performing the convolution operation on the one of the divided blocks by using a kernel; generating, via a processor, a feature map by using the output block; and writing the feature map to the memory.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
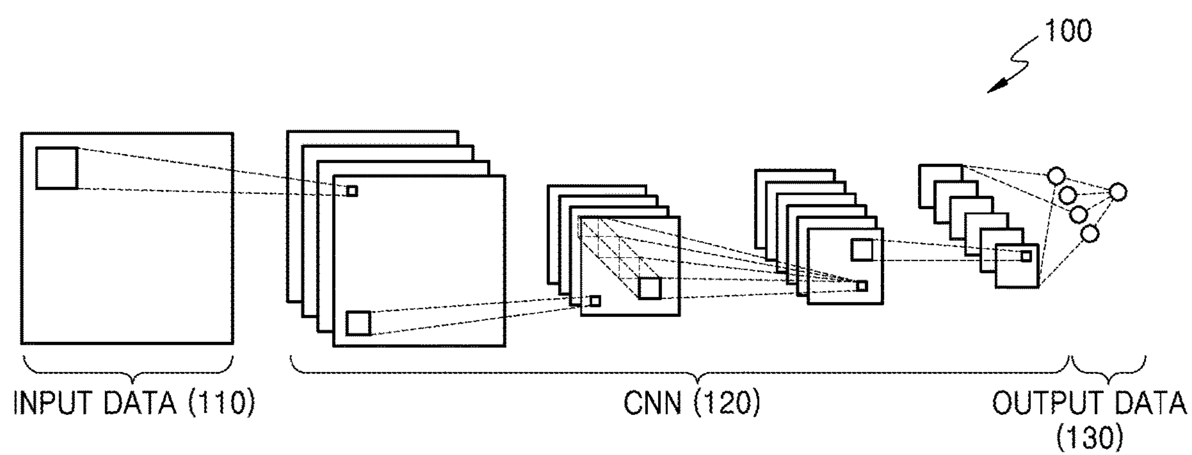
FIG. 1 is a diagram illustrating a structure of a neural network.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Therefore, it is noted that the terms used herein is construed based on practical meanings thereof and the whole content of this specification, rather than being simply construed based on names of the terms.

It will be understood that the terms "comprises," "comprising," "includes," and/or "including," when used herein, specify the presence of stated elements, but do not preclude the presence or addition of one or more other elements. The term "part" or "module" means a unit or component used to process at least one function and may be implemented as hardware (e.g., circuits, semiconductor chips, processors, etc.), software (e.g., programs, applications, firmware, etc.), or a combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

The embodiments of the present disclosure will be described in detail with reference to the accompanying drawings below.

FIG. 1 is a diagram illustrating a structure of a neural network 100.

The neural network 100 refers to a computational architecture that models the biological brain. Within the neural network 100, nodes of the brain neurons are connected to each other and collectively operate to process input data. Examples of various types of neural networks include convolutional neural network (CNN), recurrent neural network (RNN), deep belief network (DBN), restricted Boltzman machine (RBM), but the present disclosure is not limited thereto. In a feed-forward neural network, neurons in the neural network have links to other neurons. Such connections may be extended in one direction, for example, in a forward direction, through the neural network.

Referring to FIG. 1, the structure in which input data 110 is input to the neural network 100 and output data 130 is output through a CNN 120 having one or more layers is shown. The neural network 100 may be a deep neural network (DNN) having two or more layers.

The CNN 120 may be used to extract features such as borders, line colors, etc. from the complex input data 110. The CNN 120 may include a plurality of layers. Each layer may receive data, process data input to the layer, and generate data output from the layer. The data output from the layer may be a feature map generated by convoluting an input image or an input feature map with one or more filters or one or more kernels in the CNN 120. Initial layers of the CNN 120 may be operated to extract low level features such as edges or gradients from the input. Next layers of the CNN 120 may extract progressively more complex features such as eyes, a nose, and the like.

One or more layers that receive and output the feature map within the CNN 120 may be hidden layers (e.g., hidden convolution layers). Meanwhile, the CNN 120 may perform other processing operations than an operation of applying a convolution kernel to the feature map. Examples of such other processing operations may include, but are not limited to, operations such as an activation function, pooling, resampling, and the like.

The CNN 120 may be compute-intensive. For example, the CNN 120 may perform many operations on each feature map, require a large number of weights, and generate many intermediate result traffic. Also, the CNN 120 may perform giga-operations per second (GOPS) on each image, use approximately hundreds of billions or hundreds of billions of kernel weights, and generate several hundreds of gigabytes of intermediate data. Such kernel weights and intermediate data traffic have high costs in terms of power efficiency. When the traffic increases, a portion of power consumed to run the CNN 120 may increase, and consequently the use of the CNN 120 is restricted in a mobile device, application or computing environment that uses limited power.

The embodiment relates to a method and apparatus for processing a feature map at a layer within the CNN 120 described above. More specifically, the embodiment relates to reducing the memory access and internal network bandwidth consumption of the CNN 120 in a convolutional computation process based on the CNN 120. The embodiment may improve the efficiency of use of the internal memory and reduce the frequency of data accesses to the external memory or high-level cache memory performed during the convolution operation process.

Also, the embodiment may reduce data traffic and associated storage capacity with respect to intermediate results during forward execution of the CNN 120. Here, the meaning of executing the CNN 120 may mean processing data of the CNN 120 using a layer (e.g., using a device such as a processor, computing unit, etc.). Also, an example of processing of data may include applying kernels to the data provided as input to the layer that generates the feature map. Also, the intermediate result may mean output data or output blocks in units smaller than the feature map generated in the processing of the feature map.

According to the convolutional arithmetic processing technique, the data traffic in the CNN 120 may be reduced and the power required to obtain calculation results may be reduced. Also, the frequency of reading the feature map or the intermediate results from the memory may be reduced, thereby increasing the execution speed, reducing power consumption, and reducing the memory footprint.

Figure 2:
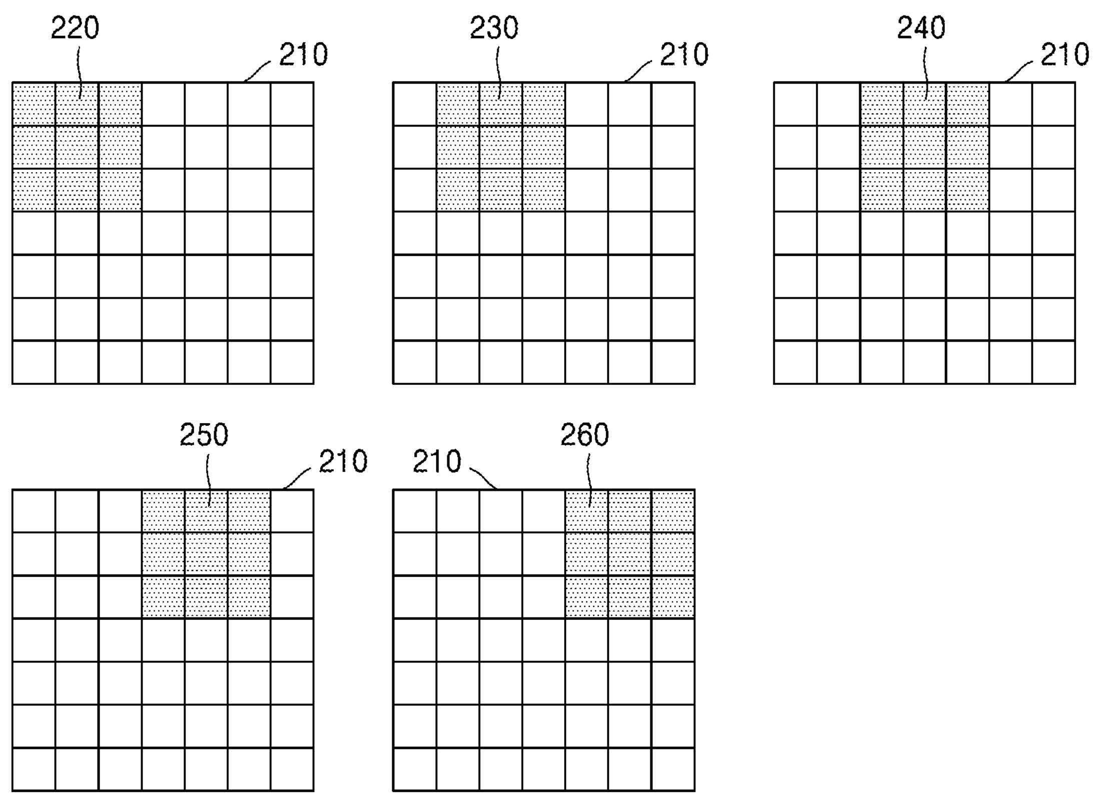
FIG. 2 is a diagram illustrating a neural network-based convolution operation process.

FIG. 2 is a diagram illustrating a neural network-based convolution operation process.

The neural network-based convolution operation process is a process in which a convolution operation between input data 210 and kernels is performed at each layer. At this time, the input data 210 may be a feature map. Referring to FIG. 2, a process of applying kernels 220, 230, 240, 250, and 260 of N×N×K size to generate output pixels with respect to the input data 210 input to a current layer is visually shown. In this case, N denotes width and height of a kernel, and K denotes depth of the kernel, which has the same value as the channel length of the input data 210. Meanwhile, the channel length of the input data 210 may be determined according to the number of kernels used in a layer before the current layer.

Referring to FIG. 2, a process of extracting characteristics of the input data 210 by applying the kernels 220, 230, 240, 250, and 260 of a predetermined size from the upper left to the lower right of the input data 210 in the current layer is shown.

For example, first, the kernel 220 may be applied to the upper left 3×3×K pixels of the input data 210 to generate a pixel value mapped to the upper left 3×3×K pixels. Thereafter, the kernel 230 may be applied to the 3×3×K pixels shifted one pixel to the right from the upper left 3×3×K pixels of the input data 210 to generate one pixel value mapped to the 3×3×K pixels shifted one pixel to the right. Thereafter, in the same process, pixel values may be generated by multiplying weights of the kernels by scanning target of the convolution operation in the input data 210 by one pixel from left to right and from top to bottom. In this case, data that is the target of the convolution operation may be scanned while moving by one pixel, but may be scanned while moving by two or more pixels. The number of pixels to which the input data 210 moves in a scanning process is referred to as a stride. The size of the feature map to be output may be determined according to the size of the stride.

A specific equation for the convolution operation may be expressed by Equation 1 as follows.

[Equation 1]

$$y[l][x][y] = \sum_{k=0}^{K-1} \sum_{m=-\frac{N}{2}}^{\frac{N}{2}} \sum_{n=-\frac{N}{2}}^{\frac{N}{2}} (w[l][k][m][n] * p[k][x+m][y+n] + b) \quad (l = 0, \ldots, L-1)$$

In Equation 1, x and y denote a pixel position in the input data 210, and I represents the channel length of the output feature map. K and N denote the size of the kernel in a channel direction and a row/column direction, respectively, and b denotes a constant. Also, w[l][k][m][n] denotes weight of the kernel, p[k][x+m][y+n] denotes the pixel value of the input data 210 input to the current layer, and y[l][x][y] denotes the pixel value of the feature map generated through the convolution operation in the current layer. According to Equation 1, the convolution operation performed in a layer of a CNN may be performed in a pixel unit.

Figure 3:
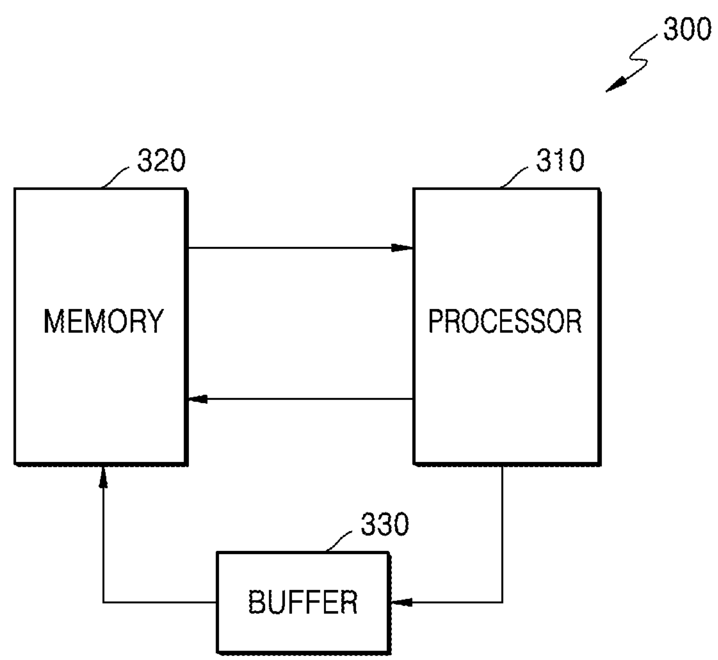
FIG. 3 is a block diagram of a convolution operation processing apparatus according to an embodiment.

FIG. 3 is a block diagram of a convolution operation processing apparatus 300 according to an embodiment.

Referring to FIG. 3, the convolution operation processing apparatus 300 may include a processor 310, a memory 320, and a buffer 330.

The processor 310 according to an embodiment may access the memory 320 to read data necessary for an operation and store an operation result again. For example, the processor 310 may execute a load instruction to read the data from the memory 320 and a store instruction to store the data in the memory 320.

The memory 320 according to an embodiment may refer to all or part of a region constituting a storage device. The memory 320 according to an embodiment may be a multi-bank structure including one or more memory banks (hereinafter referred to as "banks") to minimize the memory conflict.

The processor 310 according to an embodiment may perform a convolution operation of input data and kernels at a layer in the neural network 100. The processor 310 may read input data of a current layer from the memory 320 and write an output feature map generated as a result of performing the convolution operation to the memory 320. The input data may be a resultant (i.e., the feature map) generated and output from a layer prior to the current layer. The output feature map may be used as an input of a layer subsequent to the current layer.

Generally, the neural network 100 may generate a large amount of intermediate result traffic since the neural network 100 performs many operations for each layer. Therefore, there is a limitation in performing the operation of the neural network 100 using the processor 310 having limited performance. Accordingly, the processor 310 according to an embodiment may perform the convolution operation on data of a block unit obtained by dividing the input data input to the current layer.

The processor 310 according to an embodiment may use the buffer 330 to generate the output feature map and accumulate intermediate results generated during a convolution operation. The processor 310 according to an embodiment may store the intermediate results obtained by convoluting blocks divided from the input data and the kernels in the buffer 330 and combine the data stored in the buffer 330 to generate the output feature map. Hereinafter, the blocks divided from the input data will be referred to as "input blocks" of the current layer, and the intermediate results generated through the convolution operation between the input blocks and the kernels will be referred to as "output blocks" of the current layer.

The convolution operation processing apparatus 300 according to an embodiment may maintain the size of the input blocks (that is, the data of the block unit divided from the input data) read by the processor 310 from the memory 320 at a certain size, thereby reducing data traffic. The processor 310 according to an embodiment may reduce the frequency of reading data, thereby increasing the execution speed of the neural network 100, reducing the power consumption of the convolution operation processing apparatus 300, and reducing the storage burden of the memory 320.

A method performed by the convolution operation processing apparatus 300 according to an embodiment of processing the convolution operation will be described later with reference to FIGS. 6 through 13.

Figure 4:
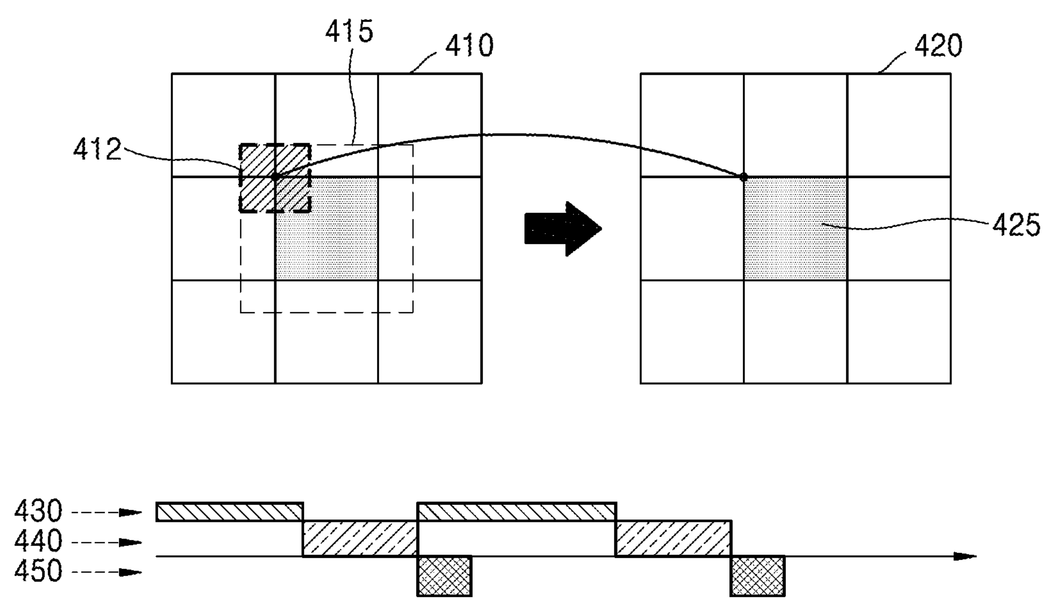
FIG. 4 is a diagram showing input and output of a layer.

FIG. 4 is a diagram showing input and output of a layer.

Referring to FIG. 4, input data 410 input to a current layer and a feature map 420 output from the current layer are shown. The feature map 420 may be read from the memory 320 and processed by the processor 310. The feature map 420 generated by the processor 310 through convolution operation processing of the input data 410 may be written to the memory 320 for progressing to a next layer.

In some cases, the hardware performance of the processor 310 may not process the entire input data 410 within a desired predetermined cycle. Accordingly, the processor 310 may divide the input data 410 and process each partial divided data for a plurality of cycles. The processor 310 may sum results of processing each partial data to produce the feature map 420 as an output. The processor 310 may read data 415 that is part of the input data 410 instead of the input data, thereby effectively utilizing available resources of the processor 310 and minimizing cycles required for the convolution operation processing.

In FIG. 4, the processor 310 may extract features of the data 415 by applying a kernel 412 having a certain size from the upper left corner to the lower right corner in the data 415 of the input data 410. The extracted features may be represented in pixel values. These pixel values may be represented as output data with respect to data 415. At this time, the output data will be block-shaped data, i.e., output block 425. The processor 310 may perform the convolution operation on each of partitioned data in the input data 410 in the same manner as described above to generate remaining output blocks. The processor 310 may generate the feature map 420 as the output of the current layer by summing the generated output blocks.

Referring to FIG. 4, the output block 425 generated by the processor 310 may correspond to the size of the block divided from the input data 410. However, the size of the data 415 read by the processor 310 from the memory 320 is larger than the size of the block divided from the input data 410. That is, the data 415 does not correspond to one block among the blocks divided from the input data 410, but partially corresponds to a plurality of blocks. In this case, since the processor 310 must access an address of each of the plurality of blocks to read the data 415, a read latency and a read overhead may occur. The reason why the read delay and the read overhead occur will be described in detail with reference to FIG. 5.

Referring to FIG. 4, flows of respective steps of reading 430, the convolution operation 440, and writing 450 are illustrated in time sequence. First, the processor 310 may perform the read 430 on the data 415. The convolution operation 440 between the data 415 and the kernel 412 may be performed only when the read 430 on the data 415 is completed. When the convolution operation 440 is completed, the generated output block 425 may be written 450 to the memory 320.

Figure 5:
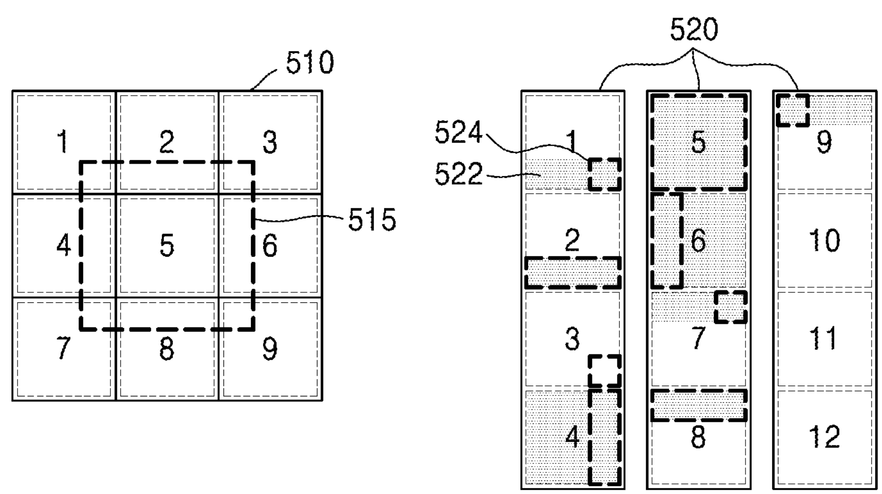
FIG. 5 is a diagram illustrating a method of reading data using an address.

FIG. 5 is a diagram illustrating a method of reading data using an address.

Referring to FIG. 5, input data 510 stored in the memory 320 is shown. The input data 510 may be divided into respective blocks (i.e., block 1 to block 9'. The address indicating a storage position in the memory 320 may be allocated to each of the blocks.

Also, referring to FIG. 5, a form in which the blocks are stored in a plurality of banks 520 of the memory 320 is shown. The blocks may be stored in each of the banks 520 and accessed by an address call of the processor 310.

As described in FIG. 4 above, the processor 310 may process only the partial input data 515 of the input data 510, taking into account the limited available resources. At this time, the partial input data 515 at least partially corresponds to the plurality of blocks. For example, the partial input data 515 may include 'block 5' of the blocks divided from the input data 510 while the input data 510 partially include remaining 'block 1' to 'block 4' and 'block 6.' However, since different addresses are assigned to the respective blocks, the processor 310 must call addresses of all the blocks (i.e., 'block 1' to block 9') to access the partial input data 515.

Meanwhile, when a plurality of addresses are simultaneously called from the memory 320, a case where the same bank 520 in the memory 320 is accessed often occurs. In this case, a stall occurs due to the occurrence of a bank conflict, which may cause deterioration of system performance. Thus, in order for the processor 310 to simultaneously access multiple addresses, dedicated hardware may be additionally needed to anticipate the bank conflict and schedule access to the memory 320 based on prediction to minimize the occurrence of the conflict.

However, due to additional hardware, the overall area of the processor 310 may increase and the design complexity may likewise increase. Also, a complex implementation of software may cause another performance degradation of the processor 310.

Further, in order for the processor 310 to access data stored in each of the banks 520, the data in the bank 520 must be read in row units. For example, to access data 524 of a region corresponding to the partial input data 515 in a region of 'block 1', the entire data 522 in row units in the bank 520 must be read. That is, the processor 310 may need to read data that exceeds the size of the partial input data 515 to use the partial input data 515 as input to the convolution operation. In this case, unnecessary data access causes the read delay and the read overhead.

Figure 6:
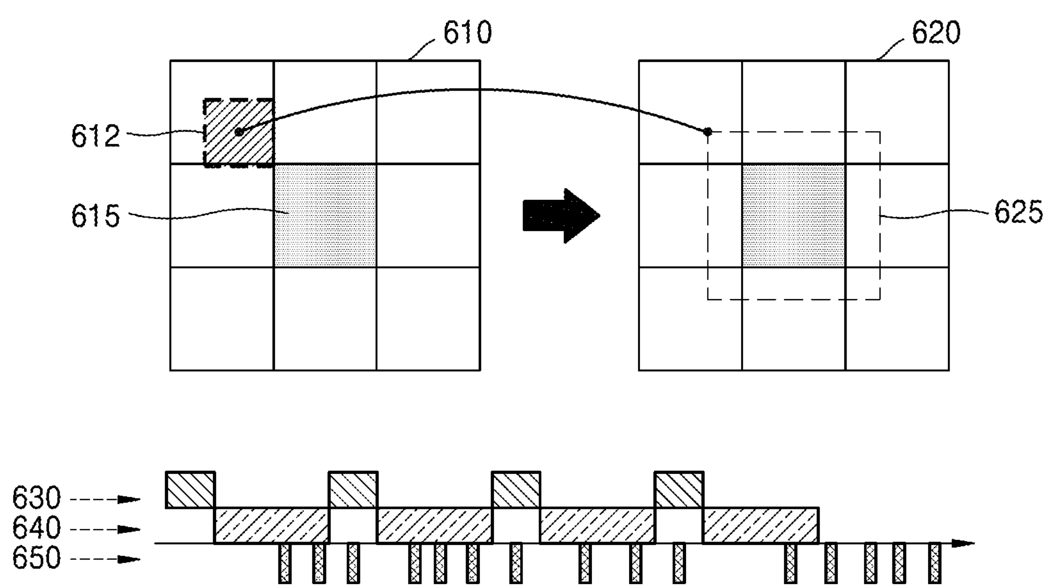
FIG. 6 is a diagram illustrating input and output of a layer according to an embodiment.

FIG. 6 is a diagram illustrating input and output of a layer according to an embodiment.

Referring to FIG. 6, input data 610 input to a current layer and a feature map 620 output from the current layer are shown. The input data 610 according to an embodiment may be read from the memory 320 and processed by the processor 310. The feature map 620 generated by the processor 310 according to an embodiment through convolution operation processing on the input data 610 may be written to the memory 320 for progressing to a next layer.

The processor 310 according to an embodiment may read partial data of the input data 610 from the memory 320. According to an embodiment, one of blocks divided from the input data 610 may be an input for the convolution operation. That is, the size of the data input to the current layer may be a fixed size. According to an embodiment, the data input to the current layer may be an input block 615.

The processor 310 according to an embodiment may extract features of the input block 615 by applying a kernel 612 of a certain size to the input block 615. The extracted features may be represented in pixel values. These pixel values are represented as an output block 625 with respect to the input block 615. In this case, the size of the output block 625 may be greater than or equal to the size of the input block 615. Meanwhile, the size of the output block 625 according to an embodiment may vary according to a stride and a size of the used kernel 612. The size of the output block 625 according to an embodiment may be determined as the size of a region where the center of the kernel 612 is moved when the kernel 612 is scanned with respect to the input block 615.

The size of the output block 625 according to an embodiment may be larger than the size of the input block 615 since the kernel 612 is applied to an inner region of the input block 615 as well as an outer region of the input block 615. The processor 310 according to an embodiment may at least partially apply the kernel 612 to the input block 615. In other words, the processor 310 may partially overlap the input block 615 and the kernel 612, without completely overlapping, in an edge or an outer region of the input block 615. At this time, a separate operation may not be performed on a region where the kernel 612 goes out of the inside of the input block 615. Thus, when the kernel 612 is multiplied with the data of the input block 615 in a manner of being out of the inside of the input block 615, a resulting output value may be interpreted as an output value from which the features of the input data 610 are not completely extracted, that is, a partial output value. The processor 310 according to an embodiment may at least partially apply a kernel to the input block 615 to generate respective output values corresponding to inner and outer positions of the input block 615 and generate the output block 625 using the respective output values.

Referring to FIG. 6, an output value of the output block 625 excluding a region corresponding to a size of the input block 615 may be a value that does not reflect a result value of partial input data in a convolution operation process. Thus, the processor 310 according to an embodiment may generate the feature map 620 as an output of the current layer in a manner of accumulating output blocks with respect to each of the blocks divided from the input data 610. A method of accumulating the respective output blocks will be described later with reference to FIGS. 7 to 8.

Referring to FIG. 6, the input block 615 read by the processor 310 from the memory 320 may correspond to the size of blocks divided from the input data 610. Thus, the processor 310 according to an embodiment only needs to call an address assigned to the input block 615 to read the input block 615. That is, the processor 310 according to an embodiment may not need to access the remaining blocks except for the input block 615 to read the input block 615. Thus, the processor 310 according to an embodiment may read the input block 615 without delay. Also, the processor 310 according to an embodiment may perform conflict-free access to one bank with reference to only the address of the input block 615.

Figure 7:
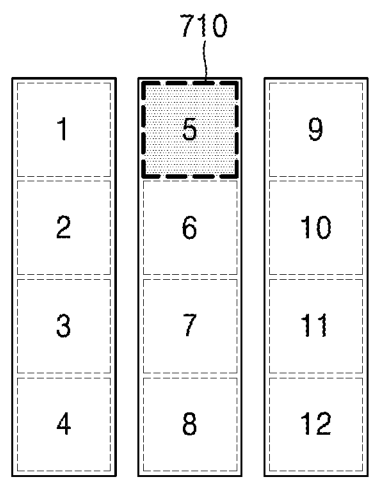
FIG. 7 is a diagram illustrating an example in which conflict-free access to a bank is performed according to an embodiment.

FIG. 7 is a diagram illustrating an example in which conflict-free access to a bank is performed according to an embodiment.

Referring to FIG. 7, data corresponding to each input block may be stored in a plurality of banks of the memory 320. For example, data corresponding to the input block 615 described above in FIG. 6 may be stored in a region 710 shown as 'block 5' among the plurality of banks. Since the data of the input block 615 according to an embodiment is not distributed and stored in the banks, the processor 310 may only call an address of the one region 710 from the memory 320, and thus the conflict-free access may be performed.

Referring again to FIG. 6, a flow of steps of reading 630, a convolution operation 640, and writing 650 is shown in time sequence. The processor 310 according to an embodiment may preferentially perform the reading 630 on the input block 615. At this time, reading 630 may have a smaller read delay than the reading 430 of FIG. 4. The processor 310 according to an embodiment may perform the convolution operation 640 upon completion of the reading 630 on the input block 615. The processor 310 according to an embodiment may immediately output result values derived in the convolution operation 640 without waiting until the convolution operation 640 is completed and write 650 the result values to the memory 320 in the convolution operation processing apparatus 300.

Figure 8A:
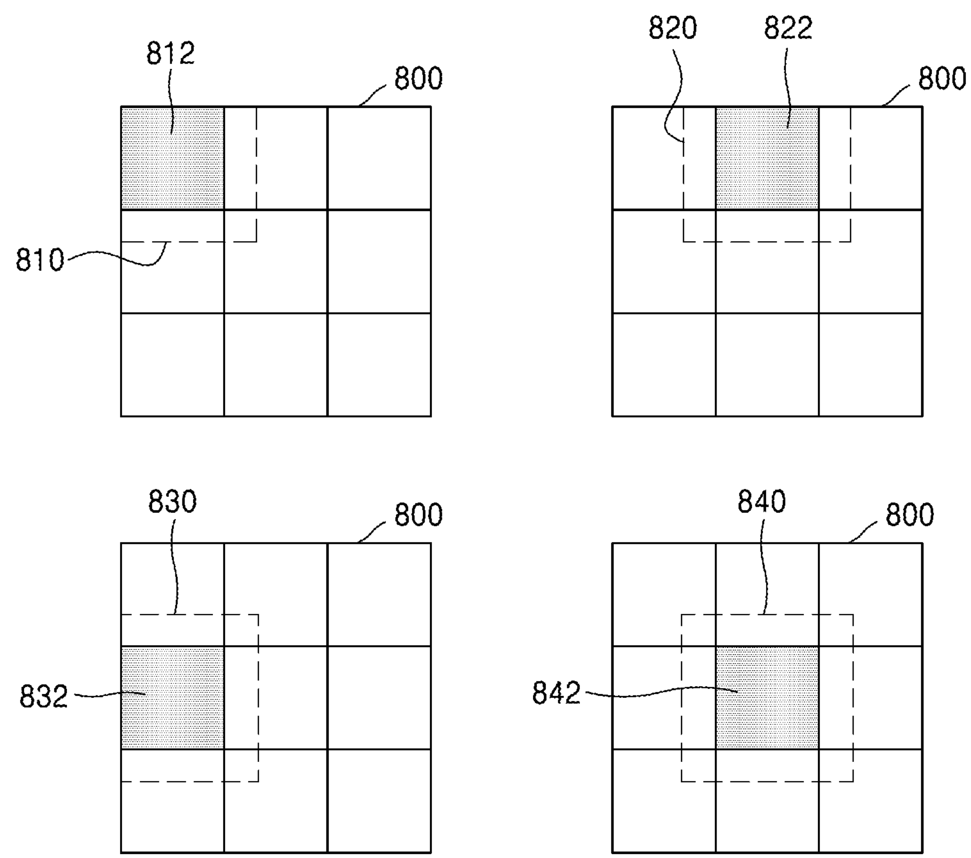
FIG. 8A is a diagram illustrating respective output blocks generated according to an embodiment.

FIG. 8A is a diagram illustrating respective output blocks 810, 820, 830, and 840 generated according to an embodiment.

The processor 310 according to an embodiment may read input blocks 812, 822, 832, and 842 from the memory 320. In this case, the input blocks 812, 822, 832, and 842 may be blocks divided from a feature map 800. The processor 310 according to an embodiment may perform a convolution operation to generate the output blocks 810, 820, 830, and 840 with respect to the input blocks 812, 822, 832, and 842, respectively. At this time, the size of the output blocks 810, 820, 830, and 840 may be larger than the size of the blocks divided from the feature map 800.

The processor 310 according to an embodiment may use the output blocks 810, 820, 830, 840 to generate an output feature map as output of a layer. The processor 310 according to an embodiment may accumulate the output block 810, 820, 830, 840 to generate the output feature map.

Figure 8B:
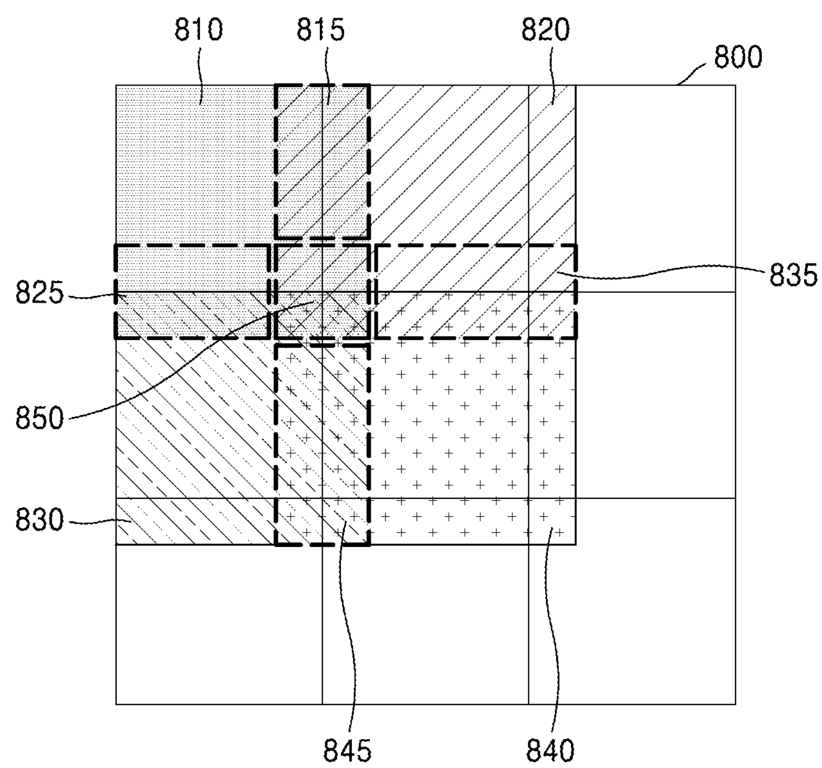
FIG. 8B is a diagram illustrating a method of accumulating respective output blocks generated according to an embodiment.

FIG. 8B is a diagram illustrating a method of accumulating the respective output blocks 810, 820, 830, and 840 generated according to an embodiment.

Referring to FIG. 8B, the method of accumulating the output blocks 810, 820, 830, and 840 is shown. Output blocks 815, 825, 835, and 845 shown in FIG. 8B correspond to the output blocks 810, 820, 830, and 840 shown in FIG. 8A, respectively.

Referring to FIG. 8B, result values of the output blocks 810, 820, 830 and 840 may be accumulated in a region 850 where the result values of the output blocks 810, 820, 830 and 840 are overlapped. In a region 815 where the result values of the output blocks 810 and 820 are overlapped, the respective result values of the output blocks 810 and 820 may be accumulated. In a region 825 where the result values of the output blocks 810 and 830 are overlapped, the respective result values of the output blocks 810 and 830 may be accumulated. In a region 835 where the result values of the output blocks 820 and 840 are overlapped, the respective result values of the output blocks 820 and 840 may be accumulated. In a region 845 where the result values of the output blocks 830 and 840 are overlapped, the respective result values of the output blocks 830 and 840 may be accumulated.

As described above with reference to FIG. 6, since a kernel according to an embodiment is partially applied to an input block, the regions 815, 825, 835, 845, 850 where the result values are overlapped between the output blocks 810, 820, 830, and 840 may occur. When the kernel out of an outside of the input block is applied, the result output value may be interpreted as a partial output value of the input data. Accordingly, the processor 310 according to an embodiment may accumulate output values of all output blocks of a current layer using the above-described method to generate a feature map as an output of the current layer.

Figure 9:
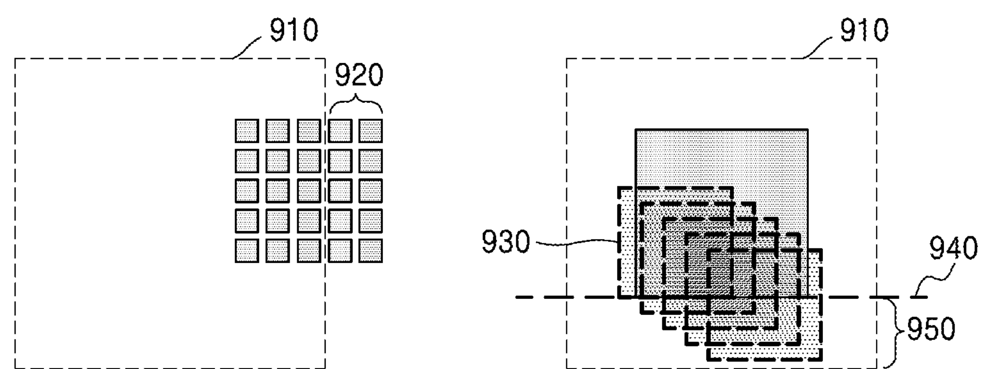
FIG. 9 is a diagram illustrating a method of controlling a data flow according to an embodiment.

FIG. 9 is a diagram illustrating a method of controlling a data flow according to an embodiment.

As described above, the processor 310 according to an embodiment may read an input block of a fixed size from the memory 320 to generate an output block. Also, the processor 310 according to an embodiment may partially apply a kernel to the input block during a convolution operation. In this case, the kernel may be out of the input block, which would inevitably cause the kernel to deviate from a region of the output block.

Referring to FIG. 9, a region 910 of the output block is shown. In the convolution operation according to an embodiment, information of a kernel existing in an outside 920 of the region 910 of the output block is an element that does not affect an output value. Thus, the processor 310 may include resources, e.g., processing elements, to accommodate a task on the region 910 of the output block. Data to be stored fixedly and used repeatedly may be stored in such processing elements. However, the kernel located on the outside 920 of the region 910 of the output block may encroach upon a resource region which is not assigned to the processor 310, thereby causing a problem of storing its own information. This phenomenon is referred to as a stack overflow.

The processor 310 according to an embodiment may include stack processing elements for processing the data flow on the kernel existing on the outside 920 of the region 910 of the output block as well as the resources to accommodate the task on the region 910 of the output block. The stack processing elements may store information to be used temporarily for control of the data flow and to be deleted.

A connection structure of the stack processing element according to an embodiment will be described later with reference to FIG. 10.

Figure 10:
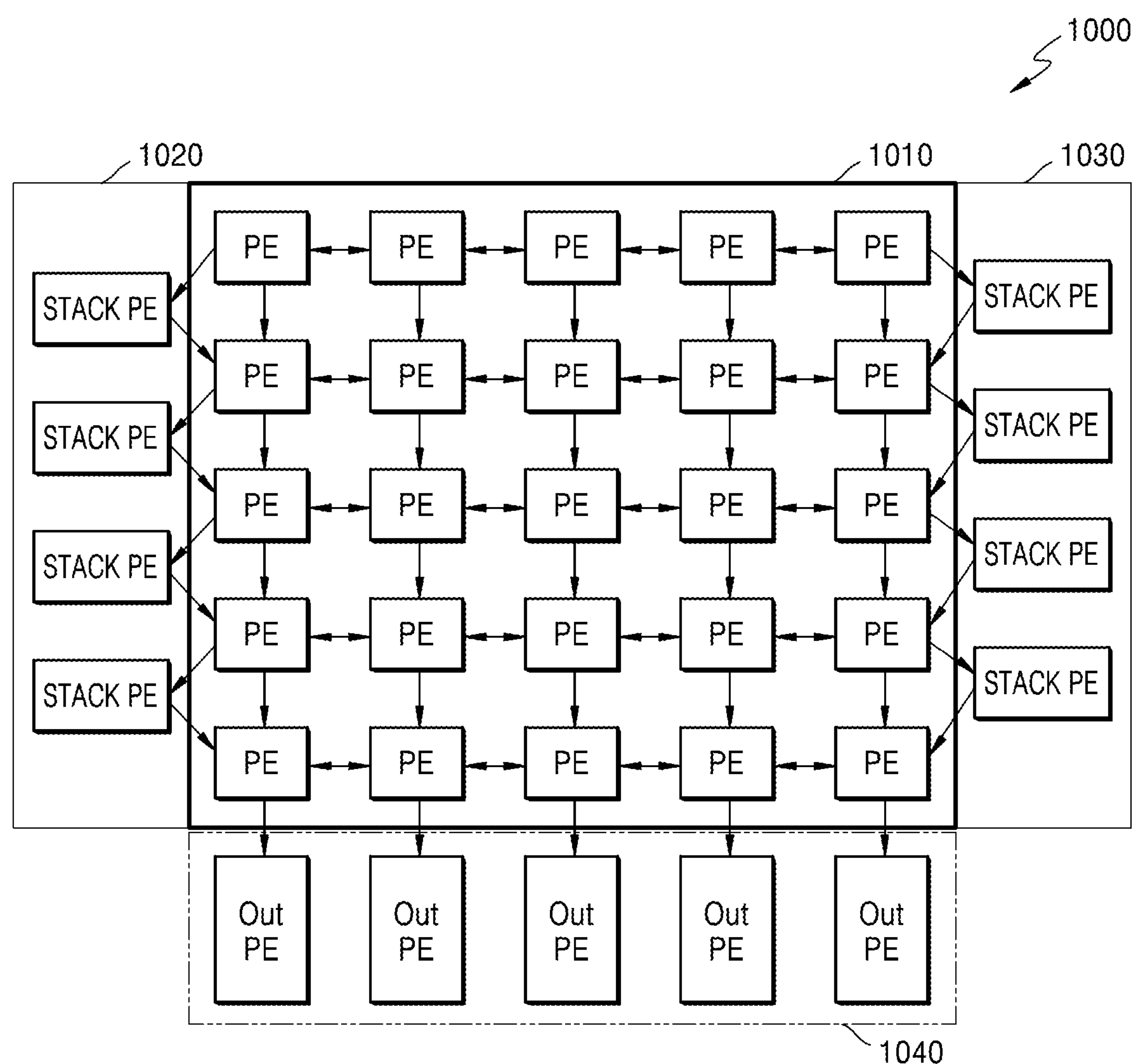
FIG. 10 is a diagram illustrating a structure of a processor according to an embodiment.

FIG. 10 is a diagram illustrating a structure of a processor 1000 according to an embodiment.

The processor 1000 according to an embodiment may include a processing element 1010, a stack processing element 1030, and a processing element 1040 for skipping. Meanwhile, the processor 1000 of FIG. 10 may correspond to the processor 310 of FIG. 3.

The processor 1000 according to an embodiment may include the processing element 1040 as a resource sufficient to accommodate a task on the region 910 of an output block. However, according to an embodiment, since it is necessary to process a data flow on a kernel located on the outside 920 of the region 910 of the output block, the processor 1000 may include the stack processing element 1030 to prevent a stack overflow. A data input/output structure of the stack processing element 1030 may be formed by last in, first out (LIFO) and first in, last out (FILO). When there is an instruction for storing a data to be temporarily used in a state where the data flow normally operates, the processor 1000 may temporarily store the data in the stack processing element 1030 according to LIFO and FILO.

When the processor 1000 according to an embodiment performs the convolution operation, in a case where an input block is scanned from the top to the bottom in row units, the stack processing element 1030 may be provided in the left or the right of the region 910 of the output block such that the data flow for a region larger than available resources of the processor 1000 may be maintained. At this time, when a kernel exists at the outside of the region 910 of the output block and at the bottom of the region 910 of the output block, since the kernel is no longer used for the convolution operation, relevant information may be skipped without being stored. Accordingly, the processor 1000 according to an embodiment may skip information of the kernel existing at the bottom of the region 910 of the output block.

When the processor 1000 according to an embodiment performs the convolution operation, in a case where the input block is scanned from the left to the right in column units, the stack processing element 1030 may be provided in the top or the bottom of the region 910 of the output block such that the data flow for the region larger than the available resources of the processor 1000 may be maintained. At this time, when the kernel is located outside the region 910 of the output block and on the right of the region 910 of the output block, since the kernel is no longer used for the convolution operation, relevant information may be skipped without being stored. Accordingly, the processor 1000 according to an embodiment may skip information of the kernel existing at the right of the region 910 of the output block.

According to various embodiments, a position of the stack processing element 1030 in the processor 1000 may be variously determined according to a scanning order of the kernel with respect to the input block.

The processor 1000 according to an embodiment may generate an output value by multiplying a weight of the kernel by moving in a predetermined number of pixels in a predetermined scanning order. The scanning order according to an embodiment may be one of various orders such as raster scan, Z-scan, N-scan, horizontal scan, and vertical scan, but the present disclosure is not limited to the scanning orders.

Figure 11:
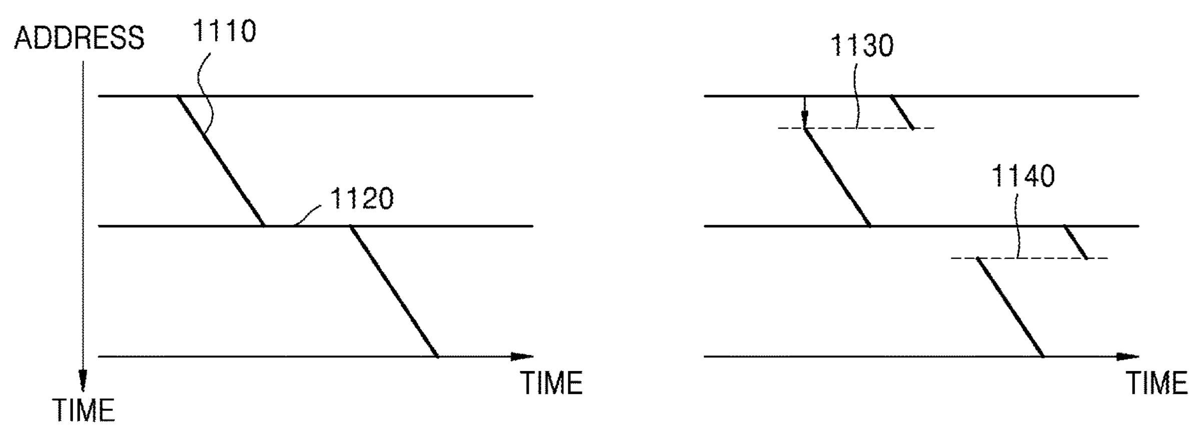
FIG. 11 is a diagram illustrating an address allocation method according to an embodiment.

FIG. 11 is a diagram illustrating an address allocation method according to an embodiment.

The processor 310 according to an embodiment may designate and store a specific pattern of address to each of processing elements to process kernels in a specific order when performing a convolution operation.

For example, when processing the kernels from the top to the bottom, the processor 310 may designate address values according to a sequential order 1110 from the top to the bottom of the processing elements.

However, as described above, in the convolution operation according to an embodiment, a kernel may be positioned partially out of an inside of an input block and multiplied with the input block. In this case, it may be efficient to perform a last operation on the kernel that exists in an outside of the input block and at the top or the bottom of the input block.

Thus, the processor 310 according to an embodiment may designate an address value of a prior order 1120 with respect to an intermediate region, except for the top and bottom of the processing elements, and then designate an address value of a posterior order with respect to top and bottom regions of the processing elements.

Figure 12:
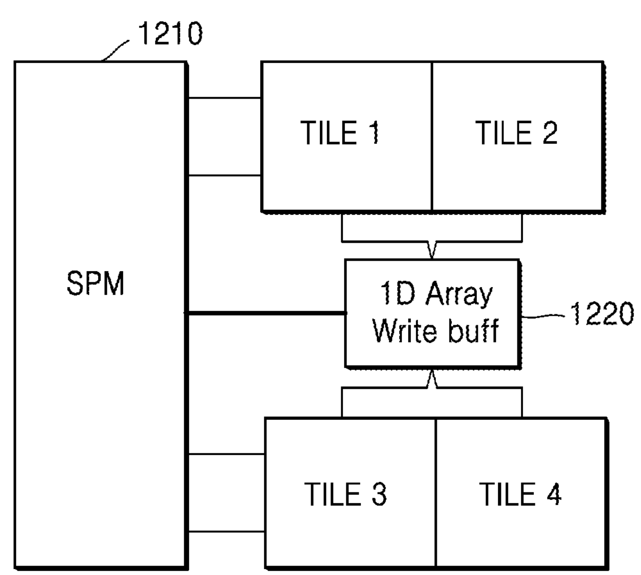
FIG. 12 is a diagram showing a buffer used for accumulation according to an embodiment.

FIG. 12 is a diagram showing a buffer used for accumulation according to an embodiment.

The convolution operation processing apparatus 300 according to an embodiment may include a scratch pad memory (SPM) 1210 and a buffer 1220. The buffer 1220 of FIG. 12 may correspond to the buffer 330 of FIG. 3.

The SPM 1210 according to an embodiment may be included in the memory 320. The SPM 1210 may be used to maintain an intermediate result generated during a convolution operation and may include a small capacity memory such as a register, cache memory, or the like.

The buffer 1220 according to an embodiment may be a temporary storage location for temporarily storing output blocks generated by the processor 310 through the convolution operation. Also, data stored in the buffer 1220 may be present in a one-dimensional array format.

The processor 310 according to an embodiment may generate an output block by partially applying a kernel to an input block when performing the convolution operation. As described above with reference to FIG. 8, a region where result values overlap with each other between output blocks may occur. Accordingly, the processor 310 according to an embodiment may accumulate the result values of the output blocks generated through the convolution operation in the buffer 1220 to generate a complete type of output feature map.

Referring to FIG. 12, data of 'tile 1' to 'tile 4' may be stored in the buffer 1220 and accumulated. The 'tile 1' to 'tile 4' shown in FIG. 12 may correspond to, for example, the output blocks 815, 825, 835, and 845 shown in FIG. 8, respectively. The 'tile 1' to 'tile 4' are partial output values of the feature map and an accumulated value of these data may be transmitted to and stored in the SPM 1210.

Figure 13:
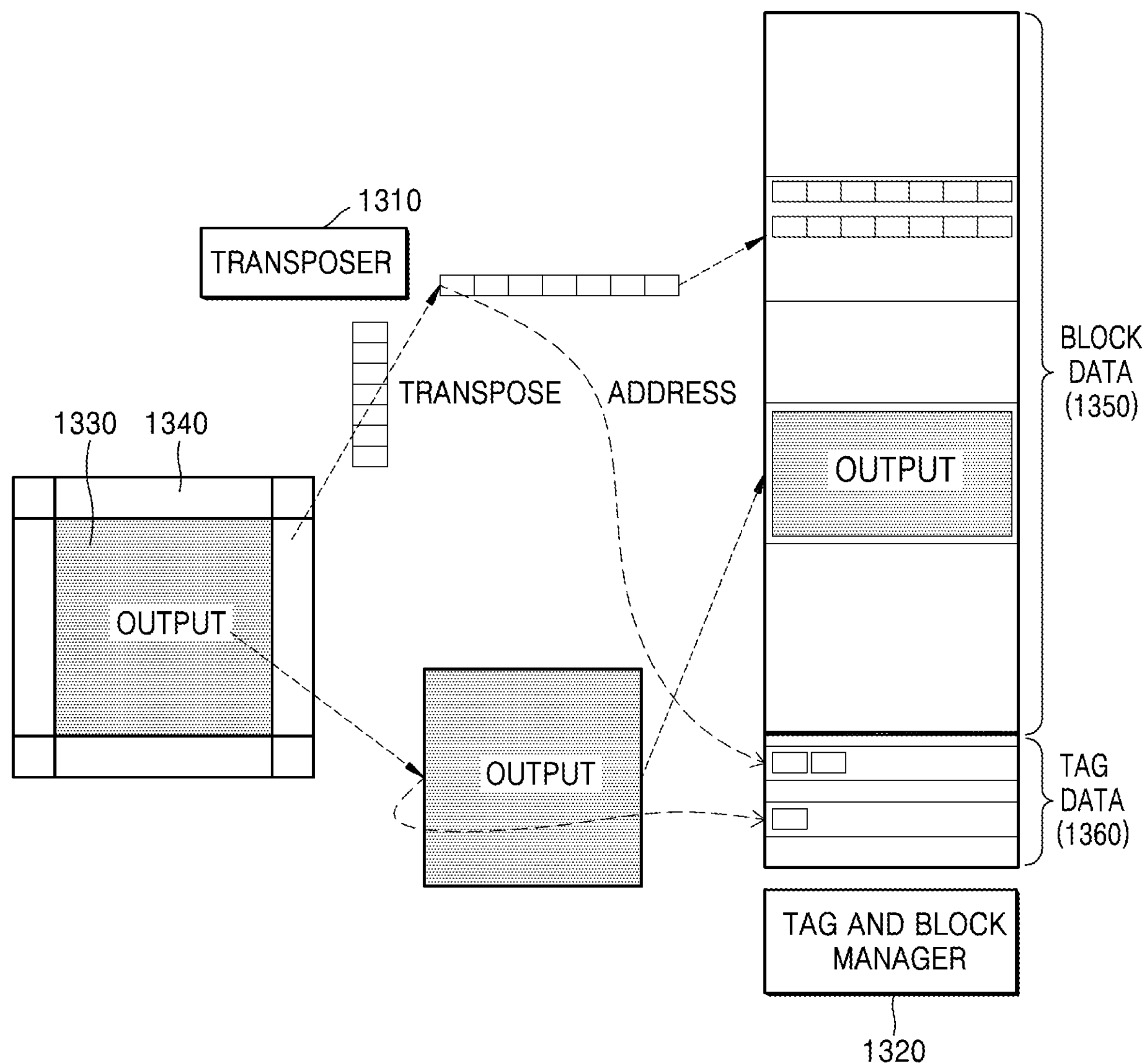
FIG. 13 is a diagram illustrating a method of performing accumulation according to an embodiment.

FIG. 13 is a diagram illustrating a method of performing accumulation according to an embodiment.

The convolution operation processing apparatus 300 according to an embodiment may include a transposer 1310 and a tag and block manager 1320.

The transposer 1310 according to an embodiment may transpose data in the form that is easy to store an intermediate result (e.g., an output block) of a convolution operation in the buffer 330. The output block according to an embodiment may be divided into two regions. The first is a first region 1330 including output values generated by multiplying an input block with the entire region of a kernel. The second is a second region 1340 including output values generated by multiplying the input block with a partial region of the kernel. Data of the first region 1330 and the second region 1340 may be stored and managed at different positions in the buffer 330

The buffer 330 according to an embodiment may store data in a one-dimensional array format. For example, the buffer 330 may store the data in a plurality of one-way slots existing in a row form.

Also, the buffer 330 according to an embodiment may include a region storing tag data 1360 in addition to a region storing block data 1350.

The data of the first region 1330 and the second region 1340 according to an embodiment may be stored in the buffer 330 as the block data 1350. At this time, the transposer 1310 according to an embodiment may perform transposition on partial data of the data in the second region 1340, and the processor 310 may store the transposed data in the buffer 330. The data of the second region 1340 according to an embodiment may include data in a row direction and data in a column direction. The data in the row direction may be easily stored in the one-way slot in the buffer 330 existing in the form of a row, but may occupy an excessively large capacity to store the data in the column direction in the buffer 330. Therefore, since the transposer 1310 according to an embodiment transpose the data in the column direction to the data in the row direction, and thus the data in the column direction may be present in the form that is easy to be stored in the buffer 330.

Addresses may be provided to the data stored in the region of the block data 1350 according to an embodiment. By providing addresses to the data stored in the buffer 330, the processor 310 may quickly access the necessary data.

The tag and block manager 1320 according to an embodiment may tag the addresses of the data stored in the buffer 330. Tag information of the tagged data may be stored in the region of the tag data 1360 and managed by the tag and block manager 1320. That is, the tag and block manager 1320 may determine actual positions where the data is stored through the addresses provided to the data.

Also, the tag and block manager 1320 according to an embodiment may generate transposition information of the data transposed by the transposer 1310. The transposition information generated according to an embodiment may be stored in the region of the tag data 1360 and managed by the tag and block manager 1320.

Figure 14:
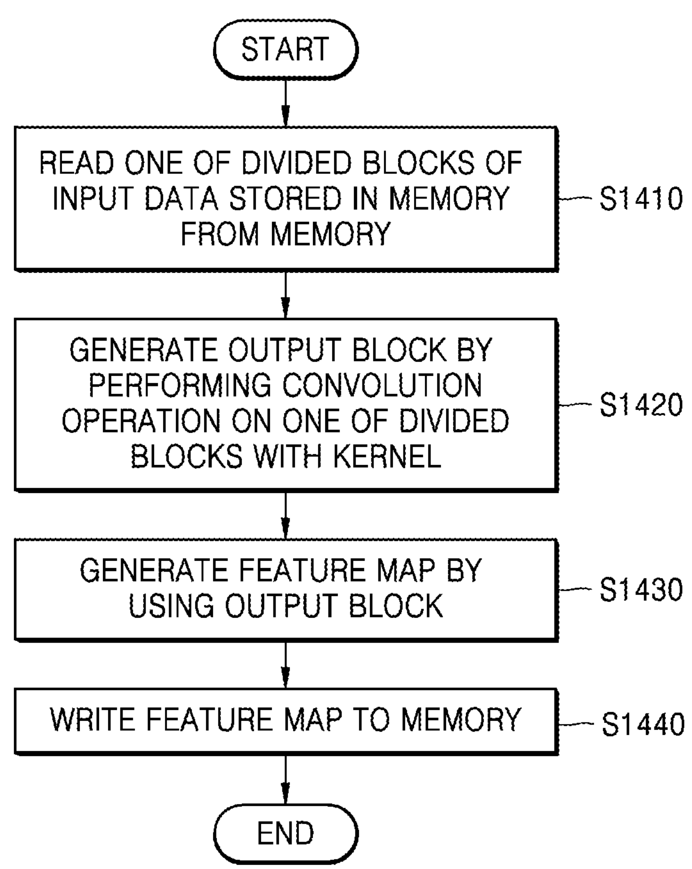
FIG. 14 is a flowchart showing a convolution operation processing method according to an embodiment.

FIG. 14 is a flowchart showing a convolution operation processing method according to an embodiment.

In operation S1410, the convolution operation processing apparatus 300 may read one of divided blocks of input data stored in memory from the memory.

In operation S1420, the convolution operation processing apparatus 300 may generate an output block by performing a convolution operation on one of the divided blocks with a kernel.

In operation S1430, the convolution operation processing apparatus 300 may generate a feature map using an output block.

In operation S1440, the convolution operation processing apparatus 300 may write the feature map to the memory.

The apparatus described herein may include a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), compact disc ROMs (CD-ROMs), magnetic tapes, floppy disks, and optical data storage devices. The computer-readable recording media may also be distributed over network coupled computer systems so that the computer readable code is stored and executed in a distributed fashion. This media may be read by the computer, stored in the memory, and executed by the processor.

The embodiments may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of techniques according to the related art for electronics configuration, signal processing and/or control, data processing and the like. The words "mechanism" and "element" are used broadly and are not limited to mechanical or physical embodiments, but may include software routines in conjunction with processors, etc.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An apparatus for processing a convolution operation in a neural network, the apparatus comprising:
- a memory; and
- a processor configured to:
  - read, from the memory, a divided block among a plurality of divided blocks of input data stored in the memory, wherein a plurality of different addresses in the memory are assigned to the plurality of divided blocks, respectively,
  - perform the convolution operation on the divided block by applying a kernel to the divided block to generate respective output values corresponding to inner pixels inside the divided block and outer pixels that are included in adjacent blocks of the divided block, without reading values of the outer pixels from the memory to provide a conflict-free access to the memory,
  - generate an output block by using the respective output values,
  - generate a feature map by using the output block, and write the feature map to the memory.

2. The apparatus of claim 1, wherein a size of the output block is larger than a size of the one of the divided blocks.

3. The apparatus of claim 1, wherein a size of the output block varies according to a size of the kernel.

4. The apparatus of claim 1,
- wherein addresses respectively corresponding to the divided blocks are assigned with respect to the divided blocks, and
- wherein the divided blocks are respectively stored in a plurality of banks of the memory and are accessible by the addresses.

5. The apparatus of claim 4, wherein the processor is further configured to perform the conflict-free access to one of the plurality of banks with reference to an address of the one of the divided blocks and read data of the one of the divided blocks from the one of the plurality of banks, based on the conflict-free access.

6. The apparatus of claim 1, wherein the processor is further configured to execute a code temporarily storing kernel information to prevent a stack overflow when performing the convolution operation.

7. The apparatus of claim 1, further comprising a buffer,
- wherein the processor is further configured to accumulate the output block and other outputs previously stored in the buffer by writing the output block to the buffer and generate the feature map based on results accumulated in the buffer.

8. The apparatus of claim 7, wherein the processor is further configured to convert data of a vertical form of the output block into data of a horizontal form and write the converted data of the horizontal form to the buffer.

9. The apparatus of claim 7, wherein the processor is further configured to perform accumulation using address information of data stored in the buffer and tag information indicating block type information.

10. A method of processing a convolution operation in a neural network, the method comprising:
- reading, from a memory, a divided block among a plurality of divided blocks of input data stored in the memory, wherein a plurality of different addresses in the memory are assigned to the plurality of divided blocks, respectively;
- performing the convolution operation on the divided block by applying a kernel to the divided block to generate respective output values corresponding to inner pixels inside the divided block and outer pixels that are included in adjacent blocks of the divided block, without reading values of the outer pixels from the memory to provide a conflict-free access to the memory;
- generating an output block by using the respective output values;
- generating, via a processor, a feature map by using the output block; and
- writing the feature map to the memory.

11. The method of claim 10, wherein a size of the output block is larger than a size of the one of the divided blocks.

12. The method of claim 10, wherein a size of the output block varies according to a size of the kernel.

13. The method of claim 10, wherein addresses respectively corresponding to the divided blocks are assigned with respect to the divided blocks, and wherein the divided blocks are respectively stored in a plurality of banks of the memory and are accessible by the addresses.

14. The method of claim 13, wherein the reading comprises:

performing the conflict-free access to one of the plurality of banks with reference to an address of the one of the divided blocks; and reading data of the one of the divided blocks from the one of the plurality of banks, based on the conflict-free access.

15. The method of claim 10, further comprising: executing a code temporarily storing kernel information to prevent a stack overflow when performing the convolution operation.

16. The method of claim 10, wherein the generating of the feature map comprises:

accumulating the output block and other outputs previously stored in a buffer by writing the output block to the buffer;

generating the feature map based on results accumulated in the buffer.

17. The method of claim 16, wherein the accumulating comprises converting data of a vertical form of the output block into data of a horizontal form and writing the converted data of the horizontal form to the buffer.

18. A non-transitory computer-readable recording medium having recorded thereon a program for performing, via a processor, operations comprising:

reading, from a memory, a divided block among a plurality of divided blocks of input data stored in the memory, wherein a plurality of different addresses in the memory are assigned to the plurality of divided blocks, respectively;

performing the convolution operation on the divided block by applying a kernel to the divided block to generate respective output values corresponding to inner pixels inside the divided block and outer pixels that are included in adjacent blocks of the divided block, without reading values of the outer pixels from the memory to provide a conflict-free access to the memory;

generating an output block by using the respective output values;

generating, via a processor, a feature map by using the output block; and writing the feature map to the memory.

* * * * *